Nov. 11, 1958  B. FRANTELLIZZI  2,859,586
AUTOMATIC CONTROL SWITCH FOR THE ELECTRIC
MOTOR WINDING UP A CLOCKWORK SPRING
Filed March 21, 1955  2 Sheets-Sheet 1
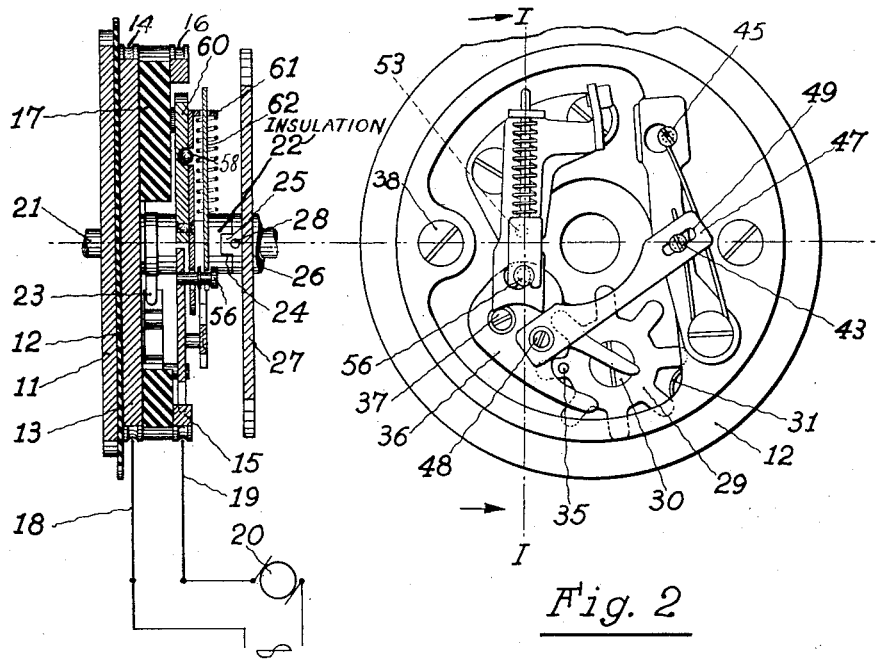
Fig. 1
Fig. 2
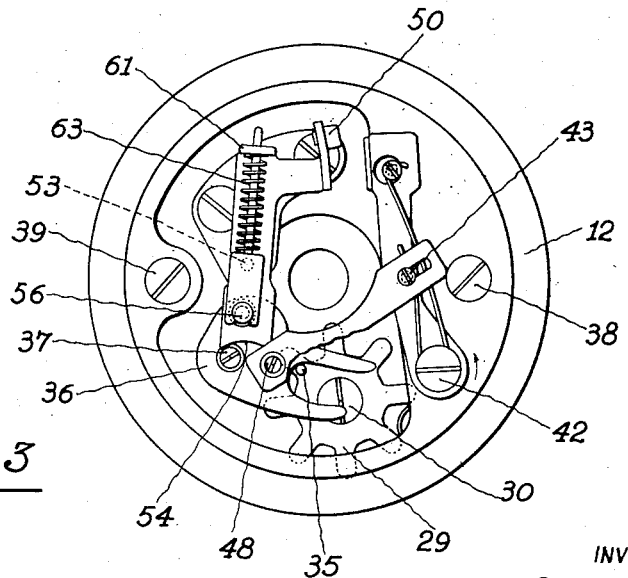
Fig. 3
INVENTOR:
Biagio Frantellizzi
BY A. John Michel
Attorney Nov. 11, 1958   B. FRANTELLIZZI   2,859,586
AUTOMATIC CONTROL SWITCH FOR THE ELECTRIC
MOTOR WINDING UP A CLOCKWORK SPRING
Filed March 21, 1955   2 Sheets-Sheet 2

INVENTOR:
Biagio Frantellizzi
BY A. John Michel
Attorney

United States Patent Office 2,859,586
Patented Nov. 11, 1958

2,859,586

AUTOMATIC CONTROL SWITCH FOR THE ELECTRIC MOTOR WINDING UP A CLOCKWORK SPRING

Biagio Frantellizzi, Rome, Italy

Application March 21, 1955, Serial No. 495,686

Claims priority, application Italy March 31, 1954

9 Claims. (Cl. 58—41)

This invention relates to an automatic control switch for the electric winding motor of a clockwork spring.

Devices have already been proposed for electrically winding up a clockwork, in which a switch connected in series with the electric motor closes the circuit when the spring has beeen unwound to a predetermined extent, thus producing the rotation of the motor and the winding of the spring when the current is on, the switch keeping its "on" position without interfering with a further unwinding of the spring during an absence of current, to cause the operation of the electric motor until the spring has fully been wound up again, as soon as the current is restored.

The use of the devices and switches so far proposed requires, however, considerable room, involves much complication, and, generally speaking, makes it necessary specially to shape the clockwork or several parts thereof. Moreover, the making of contact, with the known switches, is not quick and steady to such extent as to prevent sparking and fluctuations of current, which is a serious matter, especially where the motor is connected to the voltage of the mains.

This invention obviates all the disadvantages experienced so far, since its switch operation is reliable even when it is executed in a very reduced size, of the order of about one inch in diameter and a few millimetres in height, and this switch attains not only an instantaneous and permanent closing or breaking of circuit but also an automatic cleaning of the cooperating surfaces of contacts, no alterations in the normal structure of a clockwork or parts thereof being required to fit said switch.

Generally speaking, the switch according to the present invention is of the type in which the means controlling the breaking and making of contact is a fork member controlled by a star wheel adapted to turn by steps about a pivot which rotates together with the spring barrel. Said star wheel is obliged to rotate by one step at each turn of the rotation of the spring barrel with respect to the winding shaft by a control finger which extends in a radial direction from the winding shaft. The fork member and star wheel are so arranged that the fork member is able and forced to take three different positions, one of them when the spring is fully wound up, the second towards the end of the first turn of the spring barrel during the unwinding of the spring, and the third towards the end of the second turn of said barrel. The fork member, on taking its second position, acts upon one of the contacts in the switch having a limited range of motion, to increase its distance from the second contact, and on taking the third of said positions it acts on the second mentioned contact to displace it instantaneously from the "off" position of the switch as determined by a spring stop to an "on" position also determined by the spring stop. The displacement of said contact is caused by the reversal of direction of the action of a spring acting on the contact, but also, if necessary, by the positive cooperation of a part provided on the fork member with a part provided on the carrier of said contact, whilst, when returning from the third position to the second position during the winding up, the fork member acts on neither contact owing to the fact, as far as the contact having a limited range of motion is concerned, that the connection of this contact with the fork member comprises a lost motion joint.

The advantages attained by means of the abovementioned arrangement will appear or will be pointed out in the following description of a preferred embodiment of the invention shown in the accompanying exemplifying drawing, in which:

Fig. 1 shows a section of the switch on line I—I of Fig. 2 as viewed in the direction of the arrows, the switch being shown as fitted to the spring barrel of a clockwork, which spring barrel is shown only partly, with the winding shaft broken.

Fig. 2 is a view of the switch in its "off" position when the spring is fully wound up, but not fitted to a spring barrel, and, therefore, without the winding shaft and without the control finger of the switch, which is fixed to the winding shaft.

Fig. 3 is a similar view to Fig. 2 but after one turn has been accomplished by the spring barrel during the unwinding of the spring, thus causing a displacement of only one of the two contacts of the switch, the latter being still in the "off" position.

Figure 4:
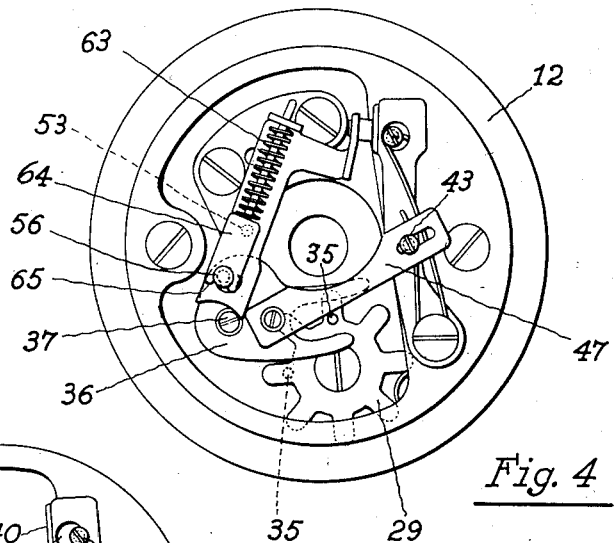
Fig. 4 is a similar view to Fig. 2 but after another unwinding turn has been accomplished by the spring barrel, thus causing the closing of the switch.

In the drawing, 11 denotes the cover of the spring barrel to which the switch is fixed to turn together with it, with the interposition of a disc 12 of an insulating material. A preferred method for fixing the switch to the cover of the spring barrel will be described hereinafter, but any desired method may be adopted in practice, provided that an electric insulation is attained between the switch and the spring barrel.

The switch comprises a circular metal plate or base 13 centrally apertured for free passage of the winding shaft, the edge of which is provided with a groove 14; it also comprises a metal annulus 15, which likewise has a circular shape and peripheral groove 16. The two members 13 and 15 are kept parallel to each other and spaced apart by means of an insulating member 17, substantially annular, fixed to both, so that the said two circular members together with the parts associated therewith form a self-contained unit.

In the groove 14 a brush 18 presses, connected to one pole of a source of current, whilst in the groove 16 a brush 19 presses which is connected to one terminal of an electric motor 20 the other terminal of which is connected to the other pole of the source of current.

The winding shaft is designated by 21 and is surrounded by an insulating sleeve 22 from which a finger 23 extends in a radial direction. Sleeve 22 must turn together with the winding shaft 21 and, therefore, must be properly fastened to said shaft. A preferred manner for firmly connecting together shaft 21 and sleeve 22 consists in forming notches 24 in the outer edge of sleeve 22 and forming associated projections 25 on the inner edge of hub 26 of the gear wheel 27 which is fixed to the winding shaft 21 by means of a through pin 28. In other words, sleeve 22 and hub 26 form the two parts of a claw clutch. Gear wheel 27 is connected to the electric motor 20 by means of a reduction gear, consequently the turning of motor 20 will cause the turning of gear wheel 27 in a clockwise direction (as viewed on Figs. 2 to 6).

Finger 23 extending from sleeve 22 cooperates with a star wheel 29 mounted on a pivot 30 fixed to plate 13. When the winding shaft 21 is stationary and the spring barrel turns together with its cover 11 while the spring is unwinding, the star wheel turns in a clockwise direction, and more exactly by a step equalling the interval between two of its points for each turn of the rotation of the spring barrel about shaft 21. Inversely, when shaft 21 turns during the winding up, and the spring barrel is substantially stationary, star wheel 29 turns in a counterclockwise direction, still by one step for each turn of shaft 21 with respect to the spring barrel.

To determine the positions of star wheel 29 in its successive steps with accuracy (see Fig. 6), there has been arranged against the points of star wheel 29 the bent end 31 of a flat spring 32 which is bent like a hairpin around a screw 33 fixed to plate 13 and the branch 32a of which rests against the surface 34 of the insulating member 17; it is readily understood that the fitting of the spring 32 is very simple. The bent end 31 of spring 32 extends partially into the groove between two points of star wheel 29, and it is readily understood that whilst the first portion of each step of star wheel 29 is accomplished with a speed dependent upon the speed of the relative motion between finger 23 and the spring barrel, the second portion of said step will take place almost instantaneously owing to the action of spring 31—32.

From star wheel 29 projects at right angles a pin 35 which is the control means for a part 36, a portion of which is shaped as a fork. The part 36, which, for the sake of simplicity, will be called hereinafter the "fork member," is mounted to swing about pivot 37 carried by plate 13. The fork member 36 is not intended to conduct electricity, and, therefore, may be made of an insulating material.

We will now consider the position taken by fork member 36 under control of pin 35:

When the spring is fully wound up, fork member 36 and pin 35 are positioned as shown in Fig. 2, where it may be seen that pin 35 is spaced from both arms of the fork. When star wheel 29 turns by one step in a clockwise direction owing to the fact that the spring barrel has almost accomplished one turn about the winding shaft 21 while the spring is unwinding, pin 35 will hit the upper arm (as seen in Figs. 2-6) and will force the fork member to take the position shown in Fig. 3, thereby displacing, as will be explained hereinafter, one of the contacts in the switch. During a further step of star wheel 29, pin 35 will hit the upper arm of fork member 36 again, and the latter will move to the position of Fig. 4, thus causing the closing of the switch. If current is on, the winding shaft 21 will be set in motion, and this will result in the rotation of star wheel 29 by steps in a counterclockwise direction, and consequently, while the first step is being accomplished in this direction, pin 35 will move fork member 36 to the position of Fig. 3, and when the second step is being accomplished, said pin, by striking the lower arm of fork 36, will force the latter to resume the position of Fig. 2, thus opening the switch.

Should however an absence of current occur, star wheel 29, as may be seen from Fig. 4, can go on with its motion by steps in a clockwise direction, without any hinderance by pin 35, while the switch keeps its "on" position to cause the winding up as soon as the current is restored. This motion of the star wheel in a clockwise direction can go on until pin 35 reaches the position shown by a dotted circle, in Fig. 4, viz., the starting position.

Figure 5:
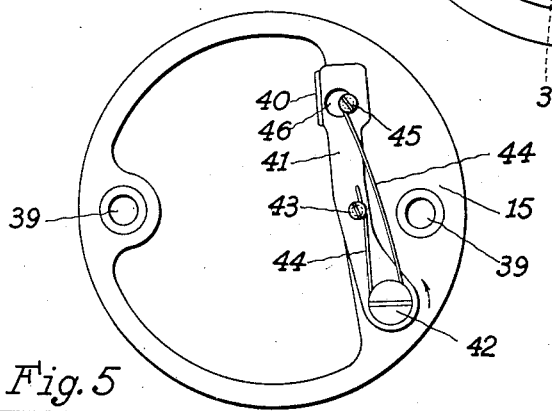
Fig. 5 shows a separate part of the switch.

Fork member 36 acts on both contacts of the switch according to the invention, one of which is electrically connected with plate 13, whilst the other is electrically connected with ring 15. This ring 15 is fixed to the insulating member 17 by means of screws 38 passing through holes 39 in annulus 15 and screwed in mating threaded holes in said insulating member 17. The contact which is electrically connected with annulus 15 and is designated by 40 is formed, as is best seen in Fig. 5, by a portion bent at right angles of a metal arm 41 which may swing about a pivot 42 carried by annulus 15. The under face of arm 41 lies on annulus 15. Arm 41 carries a pin 43 against which bears one of the ends of a flat spring 44 bent around pivot 42 and fastened to a pin 45 fixed to annulus 15 and extending through a hole 46 pierced in arms 41. Pin 45 limits the freedom of arm 41 to swing, and for this reason contact 40 has been referred to as a contact having a limited range of motion. Spring 44 tends to swing arm 41 in the direction shown by an arrow in Fig. 5, but the farthest position of the arm in that direction is determined by the cooperation of pin 45 with the right-hand periphery of hole 46 (see Figs. 2 and 5). As is shown in Fig. 2, pin 43 extends also through slot 49 provided near one end of a link 47 whose other end is pivoted on pivot 48 carried by fork member 36; in the position of the switch shown in Fig. 2, pin 43 is spaced from both ends of slot 49. However, when the fork member 36 moves from the position of Fig. 2 to the position of Fig. 3, pivot 48 for link 47 will move together with fork member 36 about pivot 37 of the latter, that is, it will get near the line passing through the axes of pivot 37 and pin 43, thereby pushing the link 47 towards the right. The spacing between pin 43 and the left-hand end of slot 49 disappears at this position. Subsequently, during the first portion of movement of fork member 36 from the position shown in Fig. 3 to that in Fig. 4, link 47 is further pushed to the right and causes arm 41 to swing, against the action of its own spring 44, in a contrary direction to the arrow of Fig. 5. This serves the very important purpose of moving contact 40 to the position that it takes (see Fig. 4) when the other contact 50 moves to the closed position of the switch. It must be appreciated that, should contact 40 be immovable, contact 50 which strikes it during its closing movement, might rebound and accomplish a few oscillations with a consequent sparking which must absolutely be prevented, especially where it is desired to make use of a motor taking the current from the mains without transformer.

Should, however, contact 40 be too yielding, it could move more quickly under the push of contact 50, thus getting away from this contact. Finally, should contact 40 be so mounted as to perform an oscillation of small amplitude during the opening of the switch, too, contact 40 would be disconnected from the other contact 50 when this contact is still moving with moderate speed, and, therefore, the disconnecting would not take place instantaneously, as is necessary in order to prevent the sparking caused by extra current.

With the arrangement as set forth above, when fork member 36 gets back from the position of Fig. 4 to the position of Fig. 3 during the winding up, owing to the provision of the lost motion joint consisting of pin 43 and slot 49, the fork member 36 will exert no action whatever on arm 41, which will keep still notwithstanding its spring 44, because contact 50, which presses on contact 40, is held by a spring stop, as will be explained below.

When, however, contact 50 moves from the "on" to the "off" position, contact 40, due to the lost motion joint, accompanies contact 50 during the first or comparatively slow portion of its movement, and disconnects during the practically instantaneous portion thereof. In this connection it will be remembered that star wheel 29 moves with a comparatively slow speed during the first portion (about one half) of each step, and with an extremely high speed during the other portion thereof; the parts of the switch which directly or indirectly are driven by the star wheel are so arranged and correlated that the engagement and the separation of the contacts takes place when contact 50 moves with an extremely high speed.

The above-mentioned contact 50 consists of a stud fixed to a bent portion 51 of one of the arms of a two-arm lever 52 pivoted at 53. Said pivot 53 for lever 52 is connected with plate 13 to carry current. The end 54 of the other arm of the two-arm lever 52 is formed as an arc whose shape is such that the pivot 37 on which fork 36 is mounted serves to limit the amplitude of the swinging of two-arm lever 52 on its pivot 53.

Figure 6:
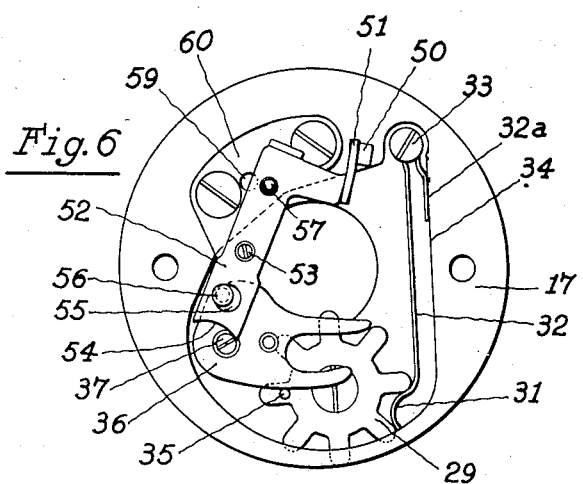
Fig. 6 shows the switch where the part shown in Fig. 5 has been taken off and other parts have been omitted.

In addition, the two-arm lever 52 is provided with a hole 55 through which a pin 56 fixed to fork member 36 projects outwardly. This is very important because in this way, during a swinging movement of said fork member 36, if lever 52 does not swing under the action of certain spring means to be presently described, it will be forced to swing by the impact of pin 56 against one side or the other (according to the swinging direction of the fork member) of the periphery of hole 55. The two-arm lever 52, moreover, is pierced by a hole 57 accommodating a small ball 58 for which there are provided two seats, only one of which, denoted by 59, is seen in Fig. 6, both formed in the metal support 60 for pivot 53, said support being electrically connected to plate 13. The other seat for ball 58 is hidden by lever 52. Ball 58 is subjected to the action of a spring means which tends to push and retain it in either seat, as will be described presently.

Obviously, owing to a suitable height of support 60, the two-arm lever 52 lies substantially on the same plane as arm 41 carrying contact 40.

Lever 52 comprises another portion 61 bent at right angles, wherein a hole is provided, as seen in Fig. 1, through which a stem 62 passes, surrounded by a compressed spiral spring 63. The end of stem 62 other than that projecting beyond the portion 61, is fixed to a plate 64 whose outermost edge 65, provided with a recess, bears on pin 56 fixed to fork member 36 and received in said recess. The hole for stem 62, the axis of pivot 53 and the recess in edge 65 are in alignment.

As may be seen in Fig. 1, spring 63 exerts not only a force in the axial direction between the bent portion 61 of lever 52 and pin 56 through plate 64, but also a pressure on ball 58 to push it towards support 60, when the said ball is not seated in either of its seats.

It will now be seen in what manner the swinging of fork member 36 will bring about a movement of the two-arm lever 52 and consequently of contact 50. Both in the position of Fig. 2 and in the position of Fig. 3 the axis of pin 56 is situated on the right of the line passing through the axes of pivots 37 and 53, and, therefore, the force of spring 63 has a component which tends to produce a counterclockwise swinging of lever 52 (looking at Figs. 2 and 3). The lever, however, is retained in the position shown owing to ball 58, which in this case is in the seat 59 seen in Fig. 6. When, however, fork member 36 swings from the position of Fig. 3 to the position of Fig. 4, pin 56 moves to the left of the line passing through the axes of pivots 37 and 53, and, therefore, the force of spring 63 has a component which imparts a clockwise swinging motion to the two-arm lever 52, thus bringing the latter to the position of Fig. 4. Should the value of said component of force be inadequate to overcome the retaining action of ball 58, pin 56, by striking the left-hand side of periphery of hole 55, will oblige lever 52 to move as said above, the amplitude of swinging of said lever being limited by ball 58 getting in its other seat.

The two-arm lever 52 is electrically connected with its support 60 not only through pin 53 but also because its underface lies on said support 60 which, in its turn, as stated hereinbefore, is electrically connected with plate 13.

By comparing Figs. 3 and 4 with each other, also considering that the distance of contact 50 from pivot 53 is substantially shorter than the distance of contact 40 from pivot 42, it will readily be understood that from the moment that the contact 50 joins contact 40 until the moment that the two contacts stop in the closed final position of switch, their cooperating surfaces accomplish a sliding movement over each other which will help to keep the two surfaces clean. A sliding movement of surfaces of contacts 40 and 50 also occurs during the opening of the switch.

Figure 7:
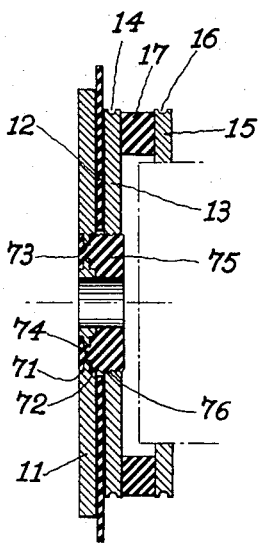
Fig. 7 is a diametrical fragmentary cross section of the switch when fixed to the cover of a spring barrel, this figure only aiming at showing a preferred manner of fixing the switch to said cover of the spring barrel.

Fig. 7 shows a preferred manner of fixing the switch on the cover of the spring barrel.

In said figure it may be seen that on both surfaces of cover 11 of the spring barrel, annular recesses 71 and 72 are formed, concentric with the axis of the spring barrel, and perforations 73 are pierced in these recesses. The cover of the spring barrel having thus been prepared, and a suitable mould having been applied to said cover, a suitable insulating material is cast in the mould to fill the recesses 71 and 72 as well as the perforations 73 with a portion of the casting denoted by 74, leaving on the outer side of cover 11 a cylindrical projection 75 which is bored centrally to provide a passage for the winding shaft and is properly screw-threaded outside at 76. The central hole of plate 13 is screw-threaded correspondingly, so that the switch is threadedly fixed to cover 11 after the insulating annulus 12 has been interposed. The thread 76 should of preference have a contrary direction to the direction of rotation of the spring barrel, but this is not absolutely necessary, since the only action which would tend to unscrew the switch is the action of finger 23 against the points of star 29, an action whose importance is quite negligble with respect to the friction of the insulating disc 12 upon cover 11 of the spring barrel and upon plate 13.

To carry out the first winding, viz. when starting from the condition in which the clockwork spring is wholly unwound, the switch is set in its closed position, with pin 35 on star wheel 29 in the position shown by a small dotted circle in Fig. 4, and in full line in Fig. 6, then the current is switched on.

It is advisable that the number of turns for the full winding of the clockwork spring be at least equal to, and preferably greater than, the number of points of star wheel 29.

What I claim is:

1. In a device for automatically switching an electric winding motor of a clockwork spring "on" and "off," wherein switch contacts are opened and closed by a pivoting fork member controlled by a star wheel adapted to turn intermittently about a pivot which is arranged to rotate together with the spring barrel, said star wheel being rotated by one step at each turn of the rotation of the spring barrel: the improvement which comprises means operatively connected with the star wheel and engaging the fork member for pivoting the fork member into three successive positions, the first one when the spring is fully wound up, the second one towards the end of the first turn of the spring barrel during the unwinding of the spring, and the third position toward the end of the second turn of the spring barrel; one switch contact mounted to permit a limited pivoting movement thereof; a second switch contact mounted for wider pivotal movement; a spring member connected with the second contact arranged to hold the contact in an "off" and "on" position, respectively; means operatively connected with the fork member for pivoting said one switch contact in the second position of the fork member to increase the distance of the one switch contact from the second contact; means operatively connected with the fork member for displacing the second contact in the third position of the fork member instantaneously from the "off" to the "on" position of the switch determined by said spring member, said displacement of the contact being caused by reversal of direction of the action of the spring member acting on the second contact; and a lost motion joint connecting the fork member and the one switch contact to prevent the fork member from acting on either contact when the fork member returns from the third to the second position.

2. The improvement of claim 1, wherein the means for displacing the second contact in the third position of the fork member includes interengaging parts of the fork member and the second contact, respectively.

3. The improvement of claim 1, comprising a winding shaft for the clockwork; a metal carrier plate having a central aperture arranged concentrically about the winding shaft with the shaft passing through the aperture, means for insulating the winding shaft from the metal carrier plate, the star wheel, the fork member and the second switch contact being mounted on the carrier plate; an annular metal carrier member arranged parallel to and spaced from the carrier plate, an annular insulating member fixed to and separating the metal carrier and carrier plate, the one switch contact being mounted on the annular metal carrier and the metal carrier plate and the annular metal carrier being provided with peripheral grooves; two brushes each in contact with one of said grooves; and an electric circuit connecting the brushes to the electric winding motor.

4. The improvement of claim 1, comprising an annular metal carrier member, an arm mounted on said carrier member, a pivot for mounting one end of the arm on the carrier member, the one switch contact being mounted on the other end of the arm, a spring arranged to bias the one switch contact toward the second contact, a stop member mounted on the carrier member and engaging the arm to limit its pivotal movement thereof in both directions, and said lost motion joint including a pin mounted on said arm intermediate its ends and a link pivoted to the fork member, said link having a slot engaged by the pin.

5. The improvement of claim 1, comprising a metal carrier plate mounting the star wheel and the fork member, a two-armed lever electrically conductively mounted on the metal carrier plate, pivot means intermediate the ends of the lever mounting the lever on the carrier plate, the second switch contact being carried by one end of the lever and the other end of the lever having the shape of a hollow arc, said arc cooperating with the pivot of the fork member to limit the pivoting movement of the two-armed lever, an annular metal carrier member arranged parallel to and spaced from the carrier plate, an annular insulating member fixed to and separating the metal carrier and carrier plate, an arm mounted on the annular metal carrier and carrying the one switch contact at one end thereof, the contacts being mounted so as to pivot in the same plate.

6. The improvement of claim 5, comprising a transverse element and a plate member, both mounted on the two-armed lever, the transverse element having an aperture and the plate member having a notch at one end, a stem fixedly connected with one end to the other end of the plate member and with its other end mounted in the transverse element aperture, said spring member being a spiral spring arranged around the stem and compressed between the transverse element and the plate member, and a pin projecting from the fork member through a hole in the two-armed lever in engagement with said notch, the spring exerting a turning moment on the two-armed lever when the pivot means for the lever, the pivot for the fork member and the said pin are out of alignment and the direction of the turning moment being reversed when the fork member moves from the second to the third position during unwinding of the spring and from the second to the first position during the winding thereof.

7. The improvement of claim 6, comprising two adjacent ball seats in the metal carrier plate, the two-armed lever having a hole near its end carrying the second contact and under the spring and within the range of said ball seats, a ball freely mounted in said hole, one seat positioning the two-armed lever when the switch is in the "off" position and the other seat to position the lever when the switch is in the "on" position, the ball pressing upon said spring when it is in neither seat and being pressed by the spring into either one of said seats.

8. The improvement of claim 1, comprising a two-armed lever carrying the second switch contact at one end thereof, a pivot for said lever, an arm carrying the one switch contact at one end thereof, and a pivot for said arm, the distance between the pivot for the lever and the second switch contact being considerably smaller than the distance between the pivot for the arm and the one switch contact.

9. The improvement of claim 1, comprising a circular base plate for mounting the switching device, the base plate having an axially concentric threaded hole, an externally threaded sleeve of an insulating material fastened to a cover of the spring barrel concentrically with the axis thereof, the threaded sleeve being mounted in the threaded hole and being provided with a central bore for the winding shaft.

References Cited in the file of this patent
UNITED STATES PATENTS

| | | |
|---|---|---|
| 1,390,018 | Bryce | Sept. 6, 1921 |
| 2,078,781 | Sprenger et al. | Apr. 27, 1937 |
| 2,694,286 | Frantellizzi | Nov. 16, 1954 |

FOREIGN PATENTS

| | | |
|---|---|---|
| 1,088,679 | France | Sept. 15, 1954 |